(No Model.)
E. J. HOWE.
COMBINED WATER FILTER AND COOLER.
No. 289,263. Patented Nov. 27, 1883.
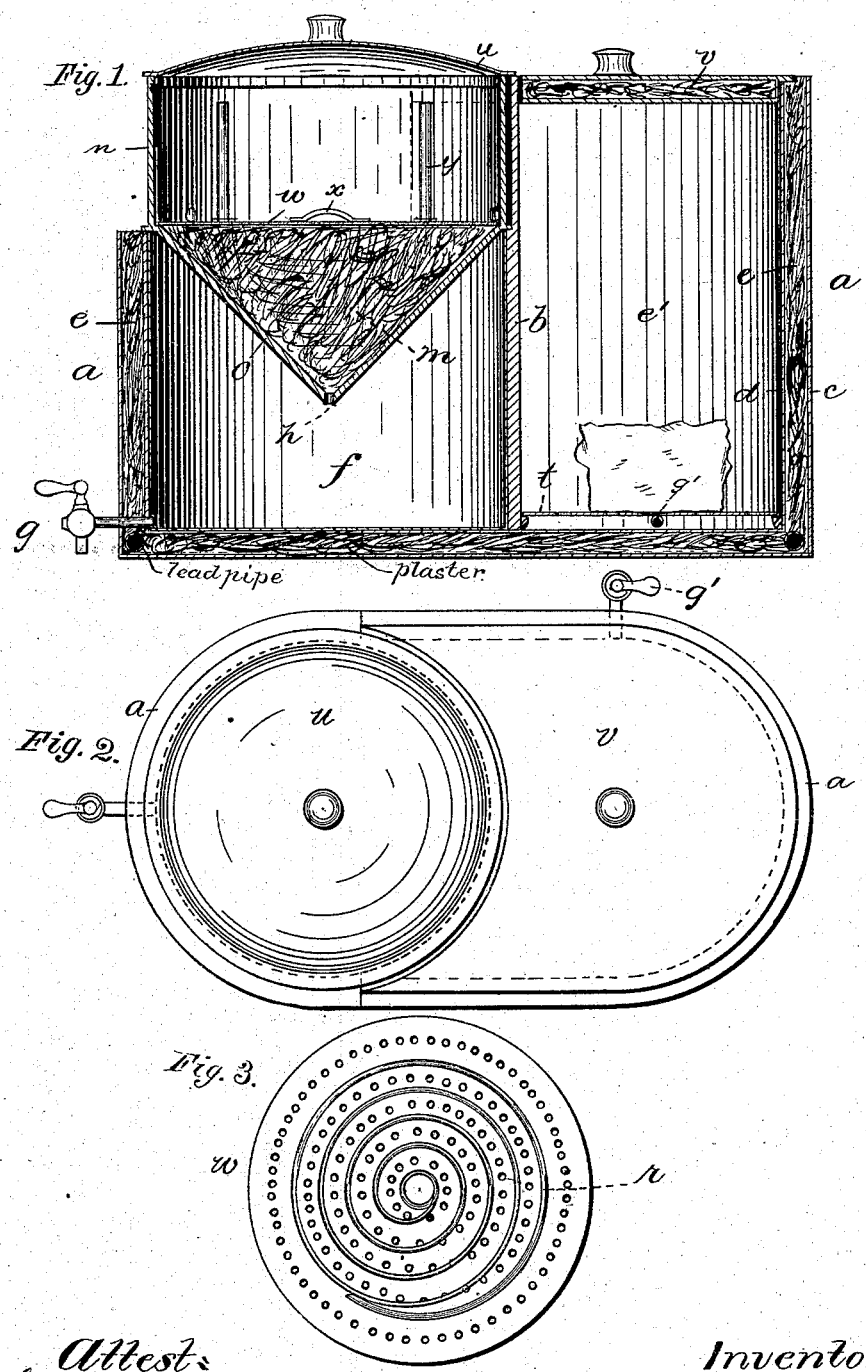

UNITED STATES PATENT OFFICE.

EDWIN J. HOWE, OF NEWARK, NEW JERSEY.

COMBINED WATER FILTER AND COOLER.

SPECIFICATION forming part of Letters Patent No. 289,262, dated November 27, 1883.

Application filed June 29, 1883. (No model.)

*To all whom it may concern:*

Be it known that I, EDWIN J. HOWE, a citizen of the United States, residing at Newark, in the county of Essex and State of New Jersey, have invented certain new and useful Improvements in a Combined Water Filter and Cooler; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a combined filter and water-cooler of increased utility, convenience, durability, and economy; and it consists in the combinations and arrangements of parts, substantially as will be hereinafter set forth, and finally embodied in the claims.

Referring to the accompanying drawings, in which similar letters of reference indicate like parts in each of the several figures, Figure 1 is a vertical longitudinal section of my improved device. Fig. 2 is a plan of the same, and Fig. 3 is a plan of a detached perforated sieve or lid adapted to be used in connection with the filter.

In said drawings, $a$ represents an exterior vessel, formed, preferably, of inner and outer metallic plates, $c\ d$, of such material as galvanized sheet-iron, the space between said plates being filled in with plaster $e$, or other non-conductor of heat. Said vessel $a$ is divided by a partition, $b$, into an ice receptacle or chamber, $e'$, and a filtered-water receptacle, $f$. The portion of the wall of the vessel where it surrounds the chamber for the reception of ice is higher than where it forms the chamber $f$ for filtered water. Said filtered-water chamber may be provided with an earthenware lining, $h$, to prevent contact of the water with the metal, whereby said water might possibly be contaminated. Above said chamber is arranged a combined filter and dirty or unfiltered water chamber, which is removable from the vessel $a$, to adapt it to be readily and easily taken from its seat on the edge of the said vessel for purposes of cleaning or renewing the filtering material $m$. Said unfiltered-water chamber has a lateral contact with the ice-chamber to enable the said unfiltered water to be cooling while waiting to pass through the filtering material. Said combined filter and unfiltered-water chamber is constructed as shown in Fig. 1, $n$ being a metallic vessel, having a funnel-shaped bottom, $o$, with a perforation, $h$, at its apex. The funnel-shaped chamber compels the water to pass through a given thickness of filtering material, while at the same time but a comparatively small amount of said material is used, and a broad top surface is provided for sediment. Within the funnel-shaped portion $o$ is placed filtering material—such as powdered charcoal—above which is arranged a sieve, $w$, perforated to allow the water to pass through to the filtering material, but adapted to hold said material in place. Said sieve $w$ is provided with strengthening-ribs $r$, Fig. 3, a suitable handle, $x$, to enable it to be readily withdrawn from its seat, and vent-tubes $y$, which extend above the water-line in the unfiltered-water chamber. When the unfiltered-water chamber is in place on its seat, as shown, the top thereof is approximately on a line with the ice-chamber, whereby a more uniform outline is given to the device as a whole. The ice-chamber and unfiltered-water chamber are both provided with suitable lids, $u\ v$, the latter being packed with a suitable non-conductor of heat. The combined filter and unfiltered-water chamber provides a cover for the filtered-water chamber, as will be evident. A suitable receptacle, $t$, is arranged in the ice-chamber to hold the ice above the floor thereof to prevent damage that might result from a sudden falling of a block of ice. By arranging the ice in a separate chamber from the filtered water the ice is prevented from melting too rapidly, while the water is given only a moderate degree of coolness; or, in other words, the filtered water is not cooled to such a degree as would be deleterious to the health. The partition $b$ is preferably curved, as indicated, to enlarge the surface thereof, and thus gain greater contact with the cold air of the ice-chamber. Said ice-chamber is provided with a faucet or cock to draw off, when necessary, the water from the melted ice. A similar faucet or cock is arranged, in connection with the filtered-water chamber, to allow the purified and cooled water to be withdrawn. The lower corners of the vessel *a* may be strengthened by means of a lead tube secured in the packing-chamber, as shown.

Having thus described my invention, what I claim is—

1. The combination of a vessel, *a*, having the partition *b*, separating said vessel into an ice-chamber and filtered-water chamber, and a removable vessel, *u*, arranged above the filtered-water chamber, and having the lower portion thereof funnel-shaped, with filtering material arranged in said funnel-shaped portion, all substantially as and for the purposes set forth and shown.

2. A combined water filter and cooler composed of the vessel *a*, formed of the inner and outer plates, *c d*, filled in with plaster or other suitable non-conductor of heat, and separated by the partition *b* into the ice-chamber *e'* and filtered-water chamber *f*, the removable unfiltered-water receptacle *n* resting above the filtered-water chamber, and having lateral contact with the ice-chamber, and provided with filtering material at the bottom thereof, all substantially as set forth.

3. In combination, in a combined filter and cooler, the vessel *a*, separated into ice-chamber *e'* and filtered-water chamber *f*, the unfiltered-water vessel having the perforated funnel-shaped portion *o*, with filtering material therein, and a sieve, *w*, the covers *u* and *v*, and faucets *g g'*, all said parts being arranged and operating substantially as and for the purposes set forth and shown.

In testimony that I claim the foregoing I have hereunto set my hand this 16th day of June, 1883.

EDWIN J. HOWE.

Witnesses:
CHARLES H. PELL,
F. F. CAMPBELL.